United States Patent [19]

Bénézech et al.

[11] Patent Number: 5,059,400

[45] Date of Patent: Oct. 22, 1991

[54] APPARATUS FOR CHEMICAL REACTION BY WET PROCESS COMPRISING A STACK EQUIPPED WITH A BARRIER AGAINST THE PROPAGATION OF MICROWAVES

[75] Inventors: Philippe H. Bénézech, Gien; Éric P. F. Quentin; Jean-Jacques R. R. Baudet, both of Briare, all of France

[73] Assignee: Societe Anonyme : Societe Prolabo, France

[21] Appl. No.: 488,134

[22] Filed: Mar. 5, 1990

[30] Foreign Application Priority Data

Mar. 6, 1989 [FR] France ............................... 89 03127

[51] Int. Cl.$^5$ .......................................... G01N 31/16
[52] U.S. Cl. ............................. 422/186; 204/157.43; 250/365
[58] Field of Search .................... 422/186; 204/157.15, 204/157.43; 250/365

[56] References Cited

U.S. PATENT DOCUMENTS

| | | | |
|---|---|---|---|
| 2,808,534 | 10/1957 | Dallons | 315/3.5 |
| 2,808,571 | 10/1957 | Cohn | 333/33 |
| 3,911,318 | 10/1975 | Spero et al. | 315/39 |
| 4,090,168 | 5/1978 | Miller et al. | 367/15 |
| 4,681,740 | 7/1987 | Commarmot et al. | 422/78 |
| 4,826,575 | 5/1989 | Karamian | 202/176 |

FOREIGN PATENT DOCUMENTS

| | | |
|---|---|---|
| 0155893 | 9/1985 | European Pat. Off. . |
| 0274611 | 7/1988 | European Pat. Off. . |
| 2004730 | 9/1970 | Fed. Rep. of Germany . |
| 1113059 | 3/1956 | France . |
| 2128935 | 10/1972 | France . |
| 398831 | 3/1966 | Switzerland . |

OTHER PUBLICATIONS

"Microwave Transmission Circuits", No. 14,629, 1948, George L. Ragan, New York-Toronto-London; p. 115, Line 21-p. 116, Line 25, FIG. 3.1.
Journal of Microwave Power, vol. 11, No. 2, Jun. 1976, Edmonton, pp. 99-104; "A-Band Model of a Microwave Applicator for Liquid Heating Applications".

Primary Examiner—Deborah L. Kyle
Assistant Examiner—J. Woodrow Eldred
Attorney, Agent, or Firm—Bacon & Thomas

[57] ABSTRACT

The invention relates to the technical field of chemical reaction.

The apparatus of chemical reaction by wet process according to the invention is characterized in that the stack is at least partly constituted by a perforated envelope forming a barrier against the propagation of microwaves.

The invention finds an application in mineralization.

11 Claims, 4 Drawing Sheets

APPARATUS FOR CHEMICAL REACTION BY WET PROCESS COMPRISING A STACK EQUIPPED WITH A BARRIER AGAINST THE PROPAGATION OF MICROWAVES

FIELD OF THE INVENTION

The present invention relates to the technical field of chemical reaction of inorganic, organic or organometallic compounds.

BACKGROUND OF THE INVENTION

Conventionally, it is necessary before most of the analyzing treatments of compounds such as abovementioned, to proceed with a chemical reaction, for example a mineralization by wet process using concentrated acids, such as sulfuric acid, nitric acid, perchloric acid, or mixtures thereof, or even a saponification by alcoholic potash, an oxidation or a reduction.

To carry out such a prior analysis treatment successfully, a conventional method consists in placing in a receptacle, such as of flask type, a quantity of the compound to be analyzed, as well as the necessary complementary volume of specific concentrated reagent.

The container is then heated and permanently watched by an operator whose responsibility it is to periodically control the calories transmitted to the receptacle in order to avoid the appearance of foams and overflowing of the product. The operator must also, at frequent intervals, stir the mixture being heated, in order to preserve a good homogeneity of the dissolved and heated compound. Finally, it is also common for reagents to be introduced in the course of the treatment, either to replace the reagent that has evaporated, or to introduce other reagents for speeding up the reaction.

Such vigilance on the part of the operator is tedious and time-consuming, moreover it is liable to provoke injuries that could be serious to the person of the operator, through risks of explosion, spattering of the composition and through the emanation of corrosive fumes and vapors.

In addition to the above drawbacks, it should be noted that the method applied does not make it possible to control efficiently any departure of fractions of the products included in the basic composition, which are driven away by the fumes and vapors escaping through the neck of the container. Consequently, the subsequent analysis result is considerably disturbed, and there is no control means which can permit an assessment of the existence and importance of this random negative factor.

In an attempt to perfect such a process, various improvements have been developed and implemented.

For example, installations have been proposed which use as heating means, instead of a direct flame, a bank of crucibles with infrared radiation, the power of each crucible being adjustable by control of its own electrical supply. Such an installation however, does not solve the problems of permanent surveillance, of stirring and of doubtful results, given that these three factors are always dependent on the permanent supervision of one or more operators.

Still with a view to improving such a process for prior analysis treatment, it has been proposed to use, as heat generator, a microwave oven provided with a fume and vapor suction port.

U.S. Pat. No. 4 090 168 teaches such a proposition and recommends the use of a microwave oven in whose cavity is placed a flask containing the sample to be treated.

This technique offers definite advantages in that the application of microwaves allows a quasi-uniform distribution of energy hence a thorough heating of the compound to be treated. For the same reasons, it is possible with such a technique to break the foams which develop with the preceding technique when the temperature of the compound rises. Therefore, theoretically, a permanent surveillance of the evolution of the treatment is no longer necessary, thus releasing the operator from this tedious and dangerous aspect of the prior method.

Moreover, the microwave oven is known for its properties of having no thermal inertia, which permits a more accurate control of the energy transmitted to the sample.

It has however been found that such an apparatus was not entirely satisfactory. Indeed, it has been observed that a certain number of products could not be treated due, in particular, to the rapid ebullition of the added reagent.

It has also been found that subsequent analysis results were not always accurate and that they implicated a factor of doubt which is no inconsiderable for certain products and is even prohibitory for others. More precisely, a loss of certain products was noted, caused by considerable amounts of fumes and vapors driving away fractions of these products, through selective evaporation and/or priming effect.

Because of the strong evaporation, a considerable pollution of the cavity of application has also been noted, necessitating cleaning of the cavity walls after each reaction and before proceeding with the subsequent treatment of a sample of same nature or not.

Another negative result of that strong evaporation is that a vapor fog is created inside the cavity where the receptacle is placed, preventing any visual assessment of the evolution of the reaction underway.

Consequently, the technique recommended by this U.S. Patent cannot, in practice, be used at the industrial level. This fact has actually been realized for some years already, since the publication by BARRETT, DAVIDOWSKI, PENARO, COPELAND, Anal. Chem. 1978-50, 1021 has disclosed an improved technique derived from the teaching of said U.S. patent, whose object is to reduce, without eliminating them, the drawbacks caused by the strong evaporation.

To improve considerably the mineralization technique making use of microwave energy, French Patent Application No. 84 03498 proposes a chemical reaction apparatus comprising a glass receptacle defining a retention volume extended by a substantially cylindrical neck. Such an apparatus further comprises a microwave energy application cavity of height substantially equal to the height of the receptacle's container portion, provided at its top with a permanently open opening of section equal, to within the clearance, to the largest measurement of the container portion taken perpendicularly to the axis of the neck, and having a stack bordering the opening and rising over a sufficient height as a function of the section of passage of the opening in order to form an absorption barrier preventing the propagation of the microwaves outside the cavity.

It is undeniable that this proposition has considerably improved the prior art by providing the means of carrying out a chemical reaction on an individual sample, without any risk of causing severe polution to the cavity.

Moreover, such a technique has made it possible to control with more accuracy than reflux rate, in order to obtain a more accurate reaction assessment.

The apparatus which have been built on the above basis have, however, proved limited as regard practical implementation, and this for the following reasons.

Said apparatus were initially designed so as to allow individual heating of flask-type receptacles with a serviceable capacity of 15 ml, capable of containing a mass of about 250 mg of inorganic, organic or organometallic compounds to be treated. It turns out that, to improve mineralization accuracy and to go along with current treatment trends, a serviceable capacity of 30 ml offering a retention capacity of 0.5 to 10 g of compounds would be more suitable.

When applying the technique of the above French Patent to carry out a Kjeldahl type mineralization, it would seem important, if not imperative, to have the use of a total capacity of at least 250 ml, in order to avoid certain transfer operations after mineralization.

The apparatus implemented in the above French Patent have also proved, with wear, to be delicate, because of the necessity of introducing through the stack every receptacle which then run the risk of being broken. Such a risk also exists from thermal shock.

Broken pieces of receptacles or flasks were found after the manipulations which had to take place, as well as dispersion or spattering of the compound to be treated, inside the application cavity.

For various understandable reasons, such a risk should be reduced to a minimum, if not eliminated altogether in order for the practical use to meet industrial requirements.

In other words, the apparatus according to the abovementioned French Patent Application has not proved entirely satisfactory, principally because of the capacity limitation which they impose on the flask type receptacles and of the risk of said receptacles breaking.

Accordingly, requirements can be assessed at about twice the present capacity.

Such a requirement should not pose any problem, in theory, inasmuch as the various dimensional characteristics governing the construction of the apparatus, receptacles and flasks, according to said French Patent, can conceivably be extrapolated.

It is, in effect, a question of a simple theoretical approach basically disregarding the energy used for raising the temperature of the sample to be treated.

One imperative way of positively meeting the abovementioned requirements is to increase the diameter of the communication opening between the stack and the microwave application cavity. Having done this, the height of the stack should, as a result, be increased correspondingly, so that said stack always acts as a barrier preventing any microwave propagation into the ambient medium, thereby complying with the essential conditions imposed for the safety of the operating staff.

Now, it is conventionally known that, for microwave energies of 2.45 GHz, a limit of serviceable cross-section of the opening between application cavity and stack, is, theoretically, around 7 cm in diameter.

In actual fact this value is purely theoretical and the practical limit to be observed, when it has been decided to use receptacles or flasks having a serviceable capacity of 300 ml, is considerably below said value.

The fact of selecting a serviceable passage section which is compatible with receptacles of such capacity, results in a structure which is characterized by a permanent microwave leaking or conduction condition, without any protection of the environment or of the personnel in charge of the operation or control of these apparatus.

In an attempt to solve the problem raised by the permanent conduction of microwave energy through the stack, traps or doors could be used, whether or not in the form of half-shells, placed around the open upper end of the stack, as well as around that of the receptacle or flask.

Such a structure however, is cumbersome and not easy to use, and above all, it is expensive to design, to build, to acquire and to maintain.

In fact, such a technique would not either be entirely satisfactory if applied to the mineralization of inorganic, organic or organometallic compounds. Indeed, from the moment when the stack comprises a secondary cavity for applying the microwave energy, the height of the stack propagates the microwave energy which is responsible for a certain heating of the mineral compounds spreading over the whole serviceable height of the receptacle. Now, it is a known fact that the mineralization process induces the formation of vapors which, normally, have to be condensed in an intermediate part of the receptacle or flask, in order to create a reflux permitting a much more accurate control of the mineralization phase by limiting the effluents.

From the moment when the microwave energy can cause a rise in temperature of the already partly heated traces, vapors or elements of compounds, the condensation and reflux phase no longer occurs, and the compound or compounds are vaporized over the whole height of the stack.

In addition to the particularly important quantitative loss in the case of a mineralization reaction, it becomes necessary to introduce specific stopping or connecting means, in order to reduce the pollution of the surrounding medium and the losses.

In other words, although the structural proposition described in the French application is a considerable improvement over the prior art, it still is not absolutely satisfactory, because of the drawbacks mentioned hereinabove.

SUMMARY OF THE INVENTION

It is now the object of the present invention to eliminate these drawbacks by providing improvements adapted to be brought to the technique disclosed in the abovementioned French application.

This object is reached with a chemical reaction apparatus according to the invention which is characterized according to the terms of claim 1.

BRIEF DESCRIPTION OF THE DRAWINGS

The invention will be more readily understood on reading the following description, with reference to the appended drawings, showing by way of example and non-restrictively, special embodiments of the object of the invention.

DETAILED DESCRIPTION OF PREFERRED EMBODIMENTS

Figure 1:
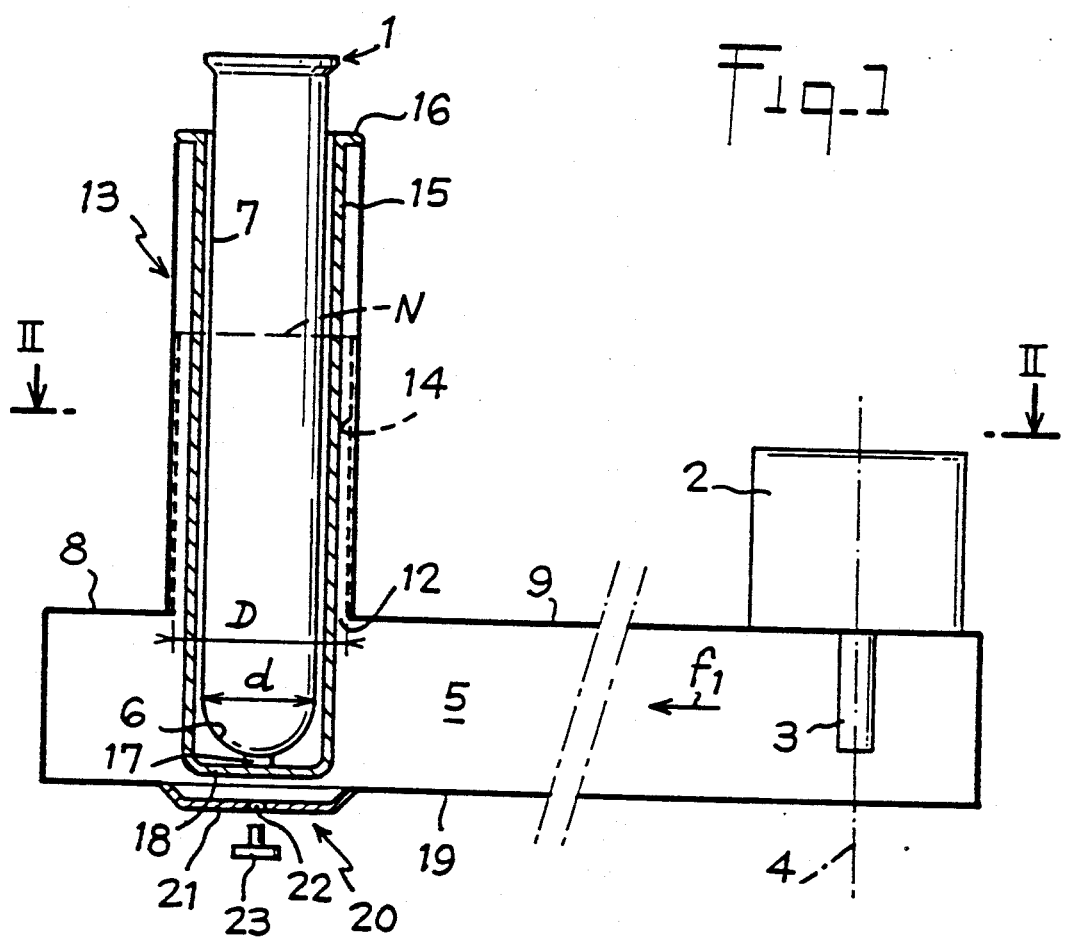
FIG. 1 is an elevational section of the apparatus for chemical reaction by wet process according to the invention.
Figure 2:
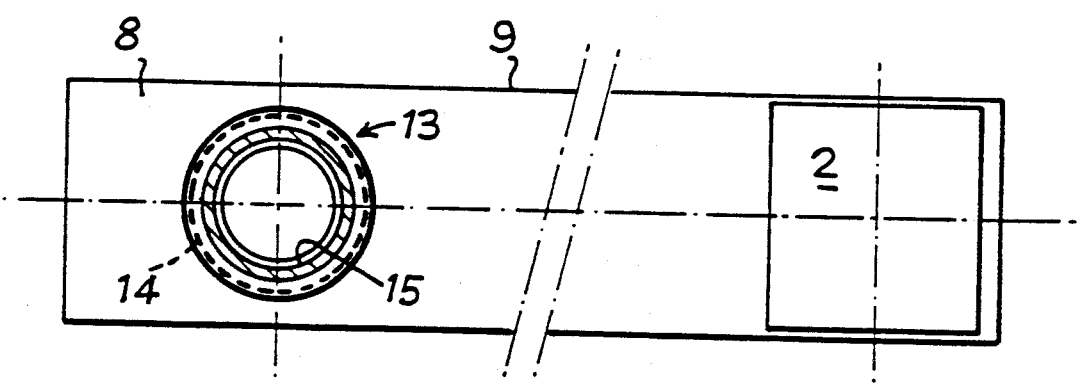
FIG. 2 is a horizontal section taken substantially along line II—II of FIG. 1.

FIGS. 1 and 2 diagrammatically show an apparatus designed to subject to a chemical reaction by wet process, a compound placed inside a receptacle 1 in which is also introduced at least one specific reagent.

The apparatus comprises a microwave generator 2 comprising an antenna 3 emitting microwaves from a plane of emission 4 into a cavity of application 5 with which the receptacle 1 must be connected.

According to the invention, the receptacle 1, such as illustrated in FIG. 1, is produced in glass or other material transparent to microwaves, in such a way as to define at its base a serviceable container portion for retention 6 extended by a neck 7 of considerable length and constant cylindrical cross-section. Preferably, the receptacle 1 is so shaped that the container portion 6 is substantially a hemispherical volume, whose diameter d, taken perpendicularly to the axis of the neck 7, is equal to the diameter of the latter. The receptacle 1 could also be produced for example in polycarbonate or in polytetrafluoroethylene and have a different shape, depending on the nature of the compound and on the chemical reaction to which said compound is to be subjected. For example, said receptacle could be cylindrical with a flat bottom.

The cavity 5, in the illustrated example, is constituted by the terminal segment 8 of a wave guide 9. The segment 8 comprises technical means usually employed for ensuring and improving the guiding and propagation of the microwaves emitted by the antenna 3 in a general propagation direction according to arrow $f_1$. According to one embodiment, the segment 8 has a constant cross-section, substantially equivalent to that of the guide 9 and can end with a water load. The segment 8 is for example constituted by a parallelepipedic envelope in stainless steel or brass. The envelope comprises, in its upper horizontal wall, a permanently open opening 12, circular in the illustrated example, whose diameter D is greater than the diameter d of the container content 6 of the receptacle 1. The circular opening 12 is situated at a predetermined distance from the bottom of segment 8, so that its vertical axis corresponds substantially to a zone of formation of an antinode by the waves emitted by antenna 3 and propagating in the direction of arrow $f_1$. To achieve such correspondence, the envelope is provided with a tuning device, not shown.

The opening 12 is bordered by a stack 13 of general cylindrical shape, which is designed to act first as a protection, and preferably as a suspension for receptacle 1, and also as a barrier preventing the propagation of microwaves when the dimensional conditions allow it.

In order to achieve the function of propagation barrier, in every case of application, even when the apparatus is built in such a way as to allow the introduction of a receptacle 1 of considerable capacity, such as for example around 300 ml, requiring a cross-section or diameter d substantially equal to of higher than 4 cm, the invention provides a stack 13 which is produced in such a way as to be at least partly constituted from a perforated envelope 14 forming, in itself, a barrier preventing the propagation of the microwaves. According to the embodiment illustrated in FIG. 1, the stack 13 is in solid material and comprises on the inside, a lining composed of a perforated envelope 14 rising over at least part of the height.

By perforated envelope is meant any conducting material, such as a grid or perforated sheet metal.

The envelope 14 makes it possible to increase the diameter of opening 12 beyond a theoretical measurement, beyond which, regardless of the height of the stack 13, a propagation of microwaves is effectively induced with dispersion into the ambient medium.

According to another constructional disposition of the invention, the diameter of stack 13, the serviceable diameter of the perforated envelope 14 and the passage cross-section of the opening 12 are predetermined in order to allow the positioning of a sleeve 15 made from any suitable material transparent to microwaves. The sleeve 15 is preferably provided at its upper part with a flange 16 constituting a suspension means by resting over the open upper cross-section of stack 13. The height of the sleeve 15 is so determined as to go through the opening 12 to be inserted substantially over the whole serviceable height of the application cavity 5. The sleeve 15 could be placed on the bottom of the application cavity. Said sleeve constitutes an element of protection for the receptacle 1 of which the base of the container portion for retention 6 can also rest, directly or via a pad 17, on the base 18 of the sleeve 15.

Further to its function of protection of the receptacle, the sleeve 15 is provided to protect the cavity 5 in case of breakage. In such a case, the fragments of the receptacle 1 and the fractions of compounds are retained by the sleeve 15 which makes their removal readily possible.

The implementation of the above means eliminates any uncontrolled propagation of microwaves in the ambient medium and limits, particularly due to the presence of the perforated envelope 14, the height of propagation of the microwaves inside the stack 13 to define a level N from which cooling can occur naturally or be induced for causing the condensation of the vapors emitted during the temperature rise, and for creating a reflux of said vapors towards the container portion for retention inside which the mineralization, in particular, is due to take place.

According to another disposition of the invention, the application cavity 5 can advantageously be produced in such a way that the underpart 19 is provided, plumb with the opening 12, with evacuation means 20 for any liquid product which may have spread inside the cavity 5. The means 20 are, for example, constituted by a bowl 21 which may be produced, as illustrated in FIG. 1, by stamping in the base 19. Said bowl 21 may be provided with an outlet 22 whose diameter may be calculated so that said bowl constitutes in itself a microwave anti-propagation barrier. If not, a plug 23 may be provided for closing off the hole 22.

Figure 3:
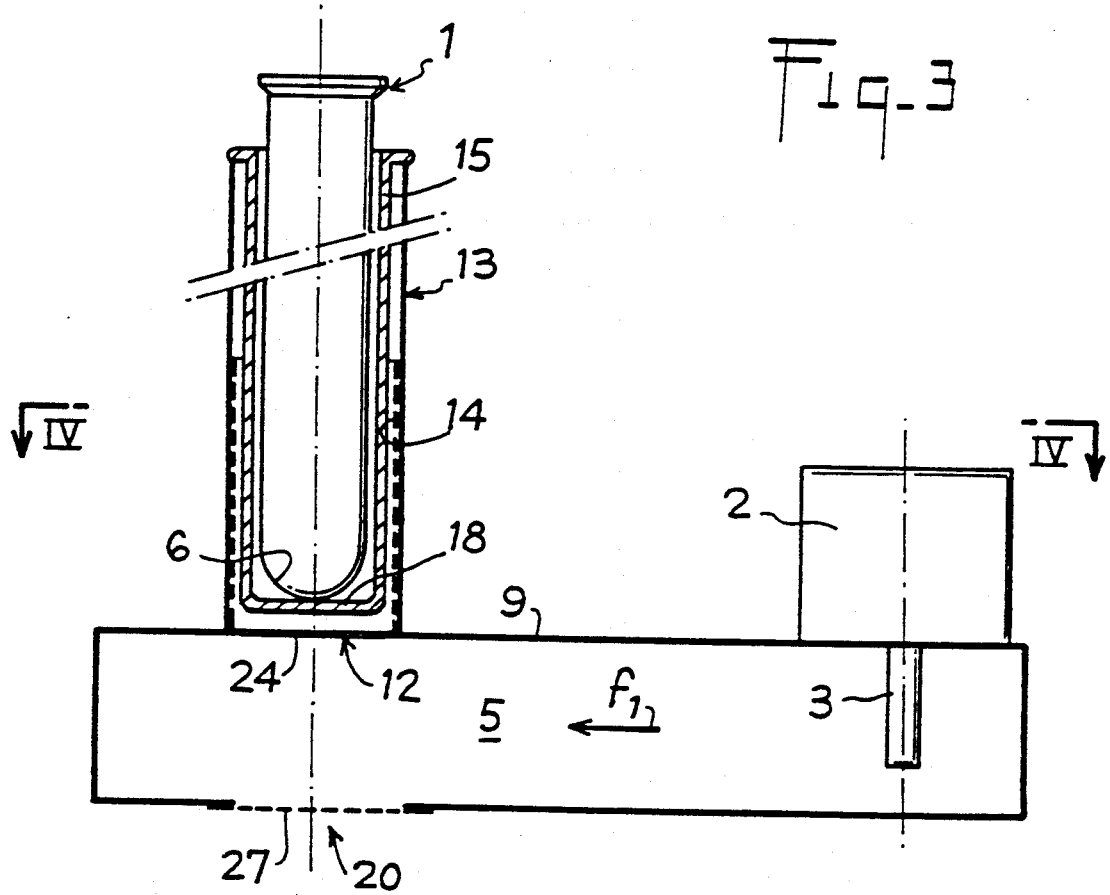
FIG. 3 is an elevational section, similar to FIG. 1, illustrating a variant embodiment.
Figure 4:
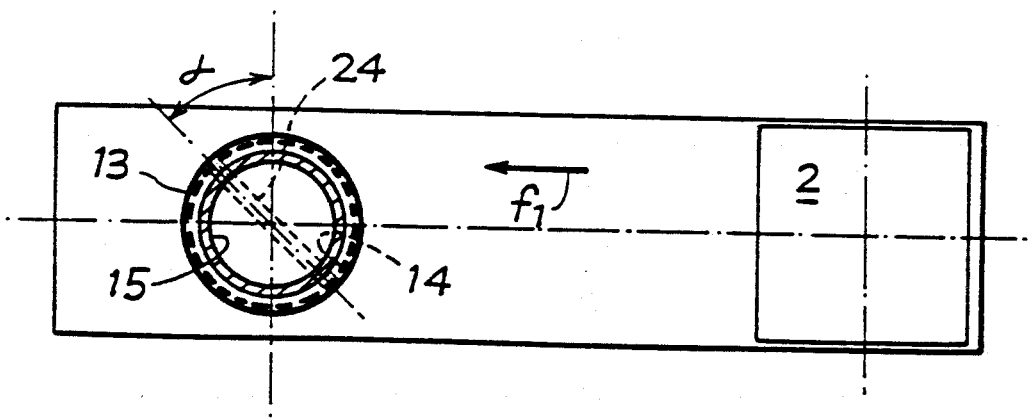
FIG. 4 is a cross-section taken along line IV—IV of FIG. 3.

FIGS. 3 and 4 illustrate a variant embodiment wherein the opening 12, provided in the top 9, is produced as a connecting window 24 whose direction is inclined with respect to the direction $f_1$ of propagation of the microwaves inside the cavity 5. The connecting window 24 is produced in conventionally known manner to achieve microwave propagation inside the stack 13 which, accordingly, constitutes an application cavity, similarly to cavity 5 in the preceding example. In such a case, the stack 13 is produced as described hereinabove and comprises a sleeve 15 whose base 18 is set at a distance above segment 8, facing the window 24. As in the preceding case, the sleeve 15 can act as a suspension means for the receptacle 1 by directly supporting the base of the container portion 6 and by resting on the open upper cross-section of the stack.

Figure 5:
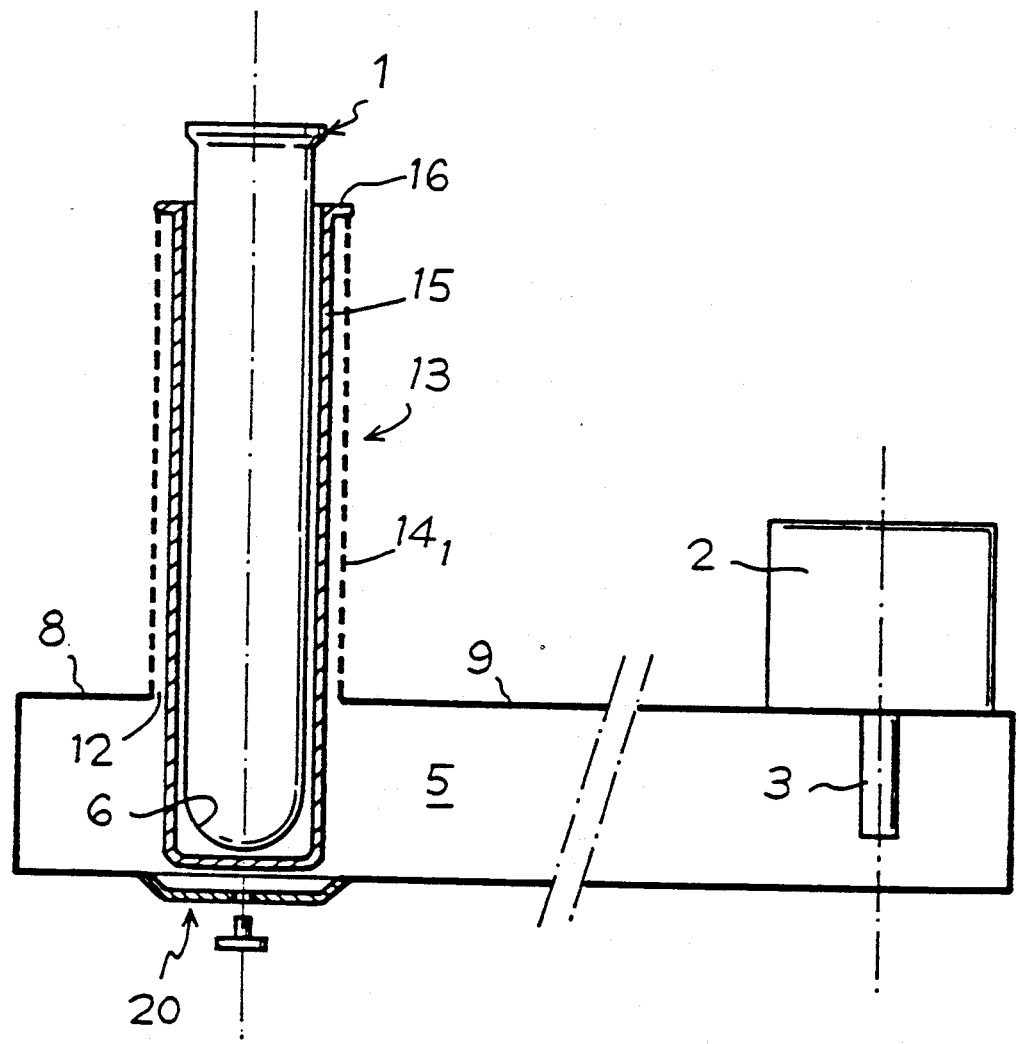
FIGS. 5 and 6 are elevational sections illustrating two other embodiments of the object of the invention.

According to a variant embodiment, illustrated in FIG. 5, the stack 13 is constituted only by a perforated envelope $14_1$ extending over the full height. Selection of the thickness of the envelope $14_1$ and of the material constituting it, is determined so that said envelope offers sufficient mechanical strength to be able to act as a support for sleeve 15 by resting of the latter on the flange 16. This particular embodiment should be considered with the form of realization illustrated in FIGS. 3 and 4.

Figure 6:
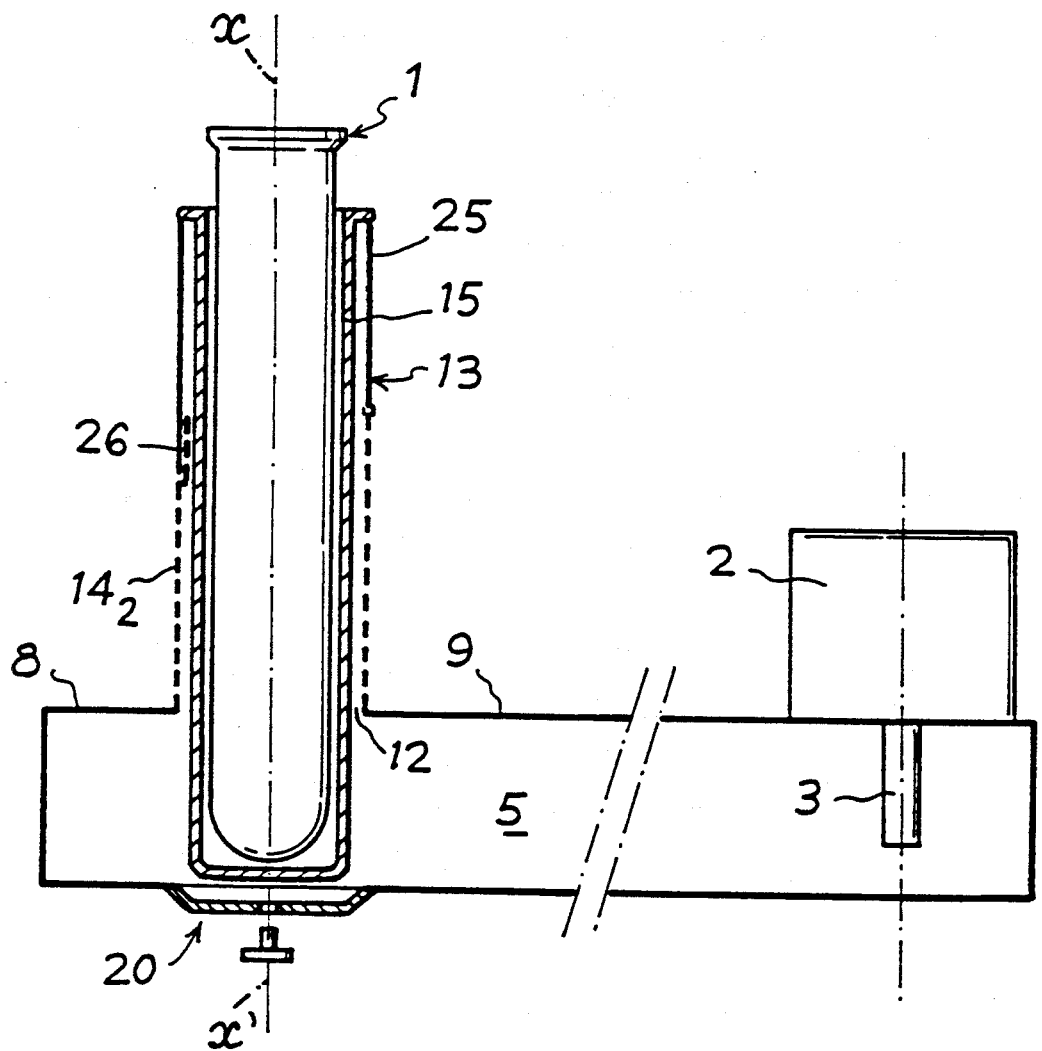

According to another embodiment illustrated in FIG. 6, in which the stack 13 is constituted by a segment $14_2$ of perforated envelope rising from the top of the segment 8 and carrying, from its top part, a segment of stack 25 in solid material. The connection between segments $14_2$ and 25 may be achieved by welding, as illustrated in the righthand part of the stack, in relation to the vertical axis x-x' or else by fitting the one over the other at the level of a narrowed portion 26 provided on the segment of perforated envelope $14_2$.

According to the embodiments illustrated in FIGS. 5 and 6, the partial constitution of the stack 13, particularly at the lower part, by a perforated envelope, gives a visual access to the sleeve 15 which, when the latter is produced from an optically transparent material, gives the operator the possibility of monitoring the progress of the treatment inside the receptacle 1, when the latter is also transparent.

FIG. 3 shows, as an example applicable to the structures illustrated in FIGS. 1, 5 and 6, a possibility of producing the evacuation means 20 in the form of a patch 27 in perforated material, which, in itself, constitutes a barrier preventing the propagation of the microwave energy.

In such a case, the patch 27 may be produced so as to give easy access to the cavity 5 for possible cleaning operations.

The invention is in no way limited to the description given hereinabove and, on the contrary, covers any modifications that can be brought thereto without departing from its scope.

What is claimed is:

1. Apparatus for chemical reaction by wet process comprising a receptacle having a container portion of retaining one or more chemical compounds and cylindrical neck portion extending beyond said container portion, means for generating microwaves and an application cavity associated with said microwave generator, said cavity being bounded by an upper wall having an opening therein and having a stack bordering the opening rising over a sufficient height to encompass the receptacle and containing a perforated envelope forming a barrier to prevent the propagation of microwaves and a sleeve of a material transparent to microwaves.

2. Apparatus as claimed in claim 1, wherein said sleeve includes a flange which is supported by the open upper end of said stack and said sleeve supports the container portion of said receptacle within said application cavity.

3. Apparatus as claimed in claim 1, wherein the stack consists of an entirely perforated envelope.

4. Apparatus as claimed in claim 1, wherein said stack comprises a perforated envelope in its lower portion of smaller height than the stack.

5. Apparatus as claimed in claim 1, wherein said perforated envelope forms the lower portion of said stack and is topped by a segment of a solid wall envelope forming the upper portion of said stack.

6. Apparatus as claimed in claim 1, wherein said stack comprises a solid wall tubular segment lined on the inside over at least its lower portion by a perforated envelope.

7. Apparatus as claimed in claim 1, wherein said stack borders an opening in the upper wall of said application cavity to allow the passage of said sleeve into said cavity.

8. Apparatus as claimed in claim 1, wherein said stack encircles an opening formed by an oblong connecting window which is inclined with respect to the microwave propagation direction, and said sleeve supports the container portion of said receptacle above the window and inside the stack whereby the stack forms a secondary application cavity.

9. Apparatus as claimed in claim 1, further comprising an evacuation bowl provided at the base of the application cavity such that said stack rises vertically with respect thereto.

10. Apparatus as claimed in claim 1, wherein said bowl is formed by stamping the base of the application cavity and is provided with evacuation means.

11. Apparatus as claimed in claim 9, wherein the bowl comprises a perforated patch.

* * * * *